(12) United States Patent
Bartolone

(10) Patent No.: US 11,534,839 B2
(45) Date of Patent: Dec. 27, 2022

(54) HYDROSTATICALLY ACTUATED WORKHOLDING APPARATUS

(71) Applicant: Hydra-Lock Corporation, Mt. Clemens, MI (US)

(72) Inventor: John V. Bartolone, Shelby Township, MI (US)

(73) Assignee: HYDRA-LOCK CORPORATION, Mt. Clemens, MI (US)

( * ) Notice: Subject to any disclaimer, the term of this patent is extended or adjusted under 35 U.S.C. 154(b) by 66 days.

(21) Appl. No.: 17/113,017

(22) Filed: Dec. 5, 2020

(65) Prior Publication Data

US 2021/0170500 A1 Jun. 10, 2021

Related U.S. Application Data

(60) Provisional application No. 62/944,449, filed on Dec. 6, 2019.

(51) Int. Cl.
  *B23B 31/30* (2006.01)
  *B23B 31/40* (2006.01)

(52) U.S. Cl.
  CPC .......... *B23B 31/305* (2013.01); *B23B 31/40* (2013.01); *B23B 31/402* (2013.01)

(58) Field of Classification Search
  CPC ... B23B 31/30; B23B 31/305; B23B 31/1172; B23B 31/1178; B23B 31/40; B23B 31/42; B23B 31/4013; B23B 31/402; Y10T 279/1021; Y10T 279/1024; Y10T 279/1029; Y10T 279/1241
  See application file for complete search history.

(56) References Cited

U.S. PATENT DOCUMENTS

| | | | | |
|---|---|---|---|---|
| 2,797,603 A * | 7/1957 | Atherholt | .............. | B23B 31/305 |
| | | | | 279/2.08 |
| 3,202,432 A * | 8/1965 | Cameron | .............. | B23B 31/305 |
| | | | | 242/576.1 |
| 3,391,878 A * | 7/1968 | Naccara | .............. | B65H 75/243 |
| | | | | 242/571.1 |
| 3,762,730 A * | 10/1973 | Cameron | .............. | B23B 31/402 |
| | | | | 279/4.06 |
| 4,114,909 A * | 9/1978 | Taitel | .................... | B23B 31/305 |
| | | | | 279/2.07 |
| 5,951,023 A * | 9/1999 | Ryan | ..................... | B23B 31/305 |
| | | | | 242/576.1 |
| 6,065,715 A * | 5/2000 | Andersson | .......... | B65H 75/243 |
| | | | | 242/571.1 |

(Continued)

FOREIGN PATENT DOCUMENTS

WO    WO-2021001929 A1 *  1/2021

*Primary Examiner* — Chwen-Wei Su

(74) *Attorney, Agent, or Firm* — Reising Ethington P.C.

(57) ABSTRACT

A workholder with a sleeve carried by a body and providing at least in part a circumferentially continuous fluid chamber between them and at least two circumferentially spaced apart locators carried by the body axially over the sleeve and projecting radially of the sleeve. A pressurized fluid in the chamber can change the diameter of the sleeve to move the locators generally radially relative to the body into firm engagement with a workpiece so that it is carried by the workholder. The locators may be received in part in a collar received at least in part axially over the sleeve with a portion of each locator projecting radially of the collar.

20 Claims, 3 Drawing Sheets

(56) References Cited

U.S. PATENT DOCUMENTS

| | | | | |
|---|---|---|---|---|
| 7,967,300 | B2* | 6/2011 | Andre | B23B 31/305 |
| | | | | 279/4.06 |
| 2004/0262855 | A1* | 12/2004 | Andre, Sr. | B23B 31/305 |
| | | | | 279/2.08 |
| 2010/0253015 | A1* | 10/2010 | Andre | B23B 31/402 |
| | | | | 279/2.08 |
| 2011/0221113 | A1* | 9/2011 | Diederichs | B25B 5/065 |
| | | | | 29/559 |

* cited by examiner

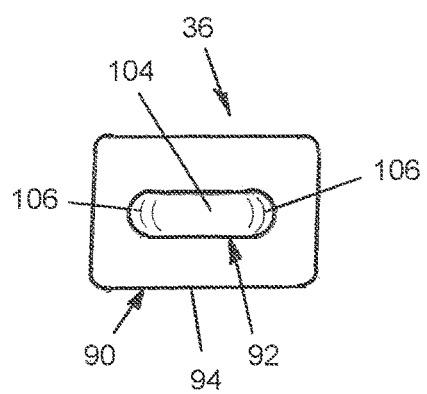
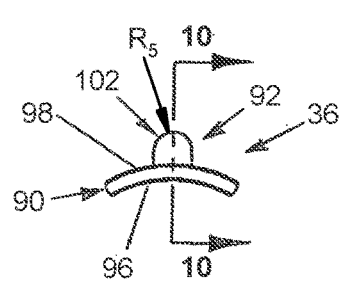
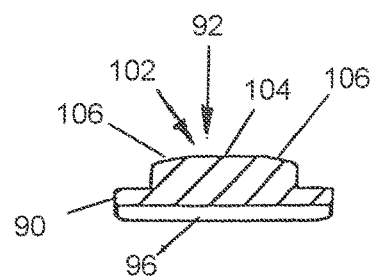
FIG. 8    FIG. 9    FIG. 10
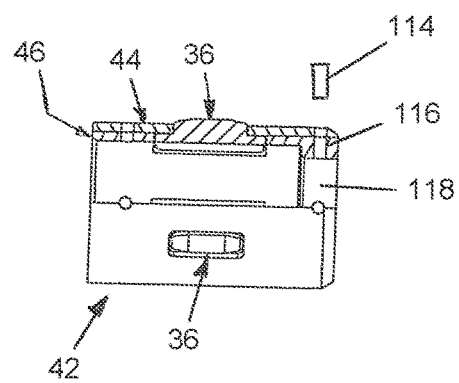
FIG. 11
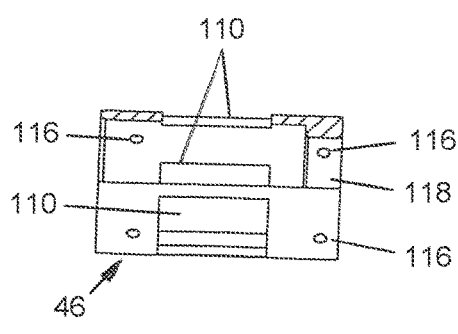
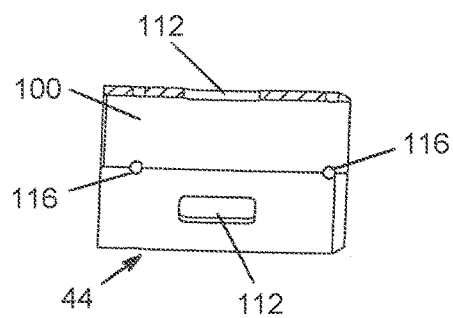
FIG. 12    FIG. 13

HYDROSTATICALLY ACTUATED WORKHOLDING APPARATUS

CROSS-REFERENCE TO RELATED APPLICATIONS

This application claims the benefit of U.S. Provisional Application No. 62/944,449 filed on Dec. 6, 2019 the disclosure of which in its entirety is incorporated herein by reference.

TECHNICAL FIELD

This invention relates generally to machine tools and gauges and more particularly to a hydrostatic workpiece holding apparatus.

BACKGROUND

Workholding apparatuses or workpiece holders for machining and gauging applications have been used for many years for holding cylindrical and annular workpieces for machining, grinding, measuring, or gauging thereof. It is known that a workpiece holder for machining or grinding workpieces may be hydraulically actuated and one such workpiece holder is disclosed in U.S. Pat. No. 7,967,300 assigned to Hydra-Lock Corporation of Mt. Clemens, Mich. which is the assignee of this application.

SUMMARY

In at least some implementations, a workpiece holder may be in the form of an arbor which may have a hydraulically expandable sleeve received on an arbor body and at least two and desirably three or more equally circumferentially spaced apart separate locators received over the sleeve and movable generally radially outward relative to the body to engage part of a bore of a workpiece to hold the workpiece for machining, grinding, gauging or measuring one or more surfaces of the workpiece. In at least some implementations the locators may be generally circumferentially and axially located by a retainer collar at least in part received over the sleeve of the arbor. In at least some implementations, the retainer collar may have an outer sleeve received over an inner sleeve. In at least some implementations, the arbor may include one or more stops to axially locate a workpiece relative to the locators and/or expandable sleeve.

BRIEF DESCRIPTION OF THE DRAWINGS

The following detailed description of the embodiments and best mode will be set forth with reference to the accompanying drawings in which:

FIG. 8 is an enlarged top view of a locator of the workpiece holder of FIG. 5;
FIG. 9 is an enlarged end view of the locator of FIG. 8;
FIG. 10 is an enlarged sectional view of the locator taken on line 10-10 of FIG. 9;
FIG. 11 is a half section side view of a retainer collar of the workpiece holder of FIG. 5;
FIG. 12 is a half section view of an inner sleeve of the collar of FIG. 11;
and
FIG. 13 is a half section view of the outer sleeve of the collar of FIG. 11.

DETAILED DESCRIPTION

Figure 1:
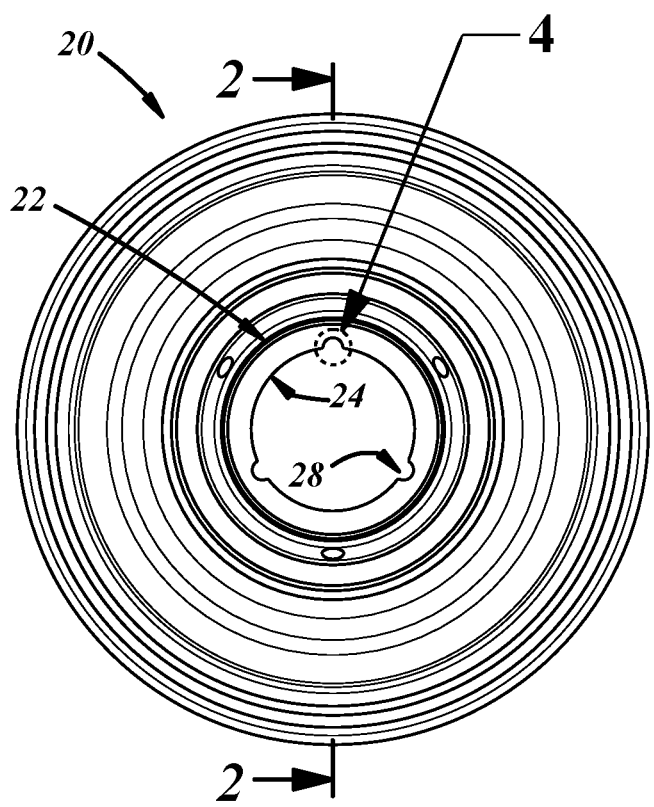
FIG. 1 is a side view of a pulley workpiece.
Figure 2:
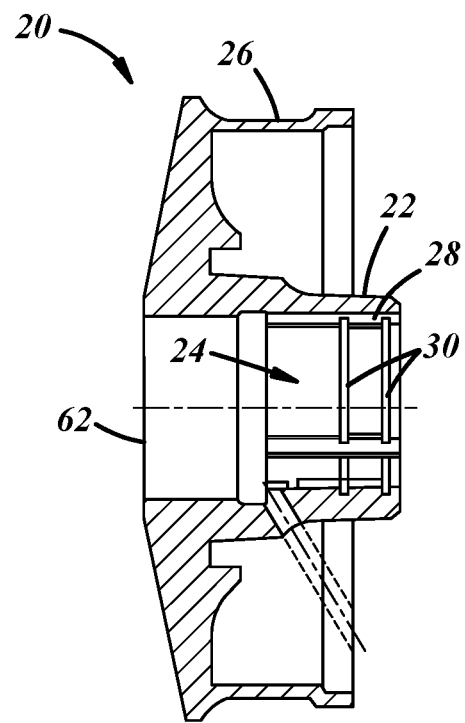
FIG. 2 is a sectional view taken on line 2-2 of FIG. 1.
Figure 3:
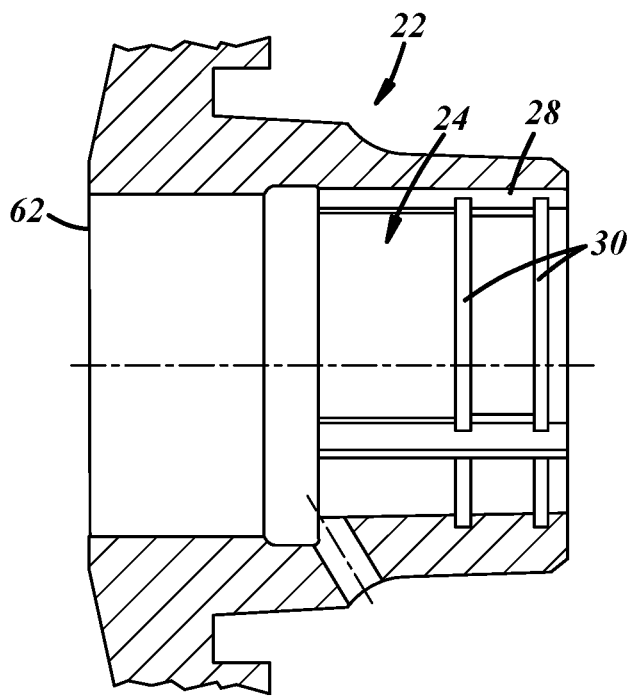
FIG. 3 is a fragmentary enlarged sectional view of a portion of the hub of the pulley.
Figure 4:
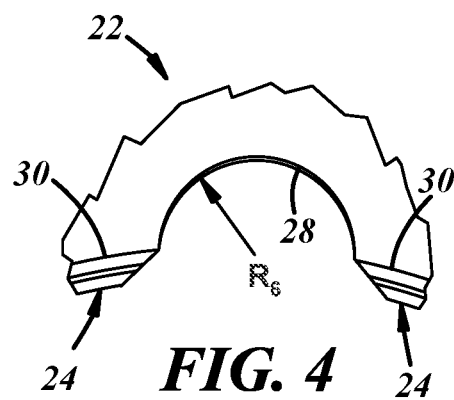
FIG. 4 is a fragmentary enlarged sectional view of a portion in the circle 4 of the hub of the pulley workpiece of FIG. 1.

Referring in more detail to the drawings, FIGS. 1-4 illustrate a pulley wheel 20 with a hub 22 configured to be received on and connected to a shaft for rotation therewith. The hub may have a central bore 24 essentially coaxial with a cylindrical peripheral surface 26 of the pulley wheel. The hub may have three equally circumferentially spaced apart and axially extending grooves 28 each configured to receive a roller key therein. The hub may also have two axially spaced apart and circumferentially extending oil grooves 30 each opening into the roller key grooves.

Figure 5:
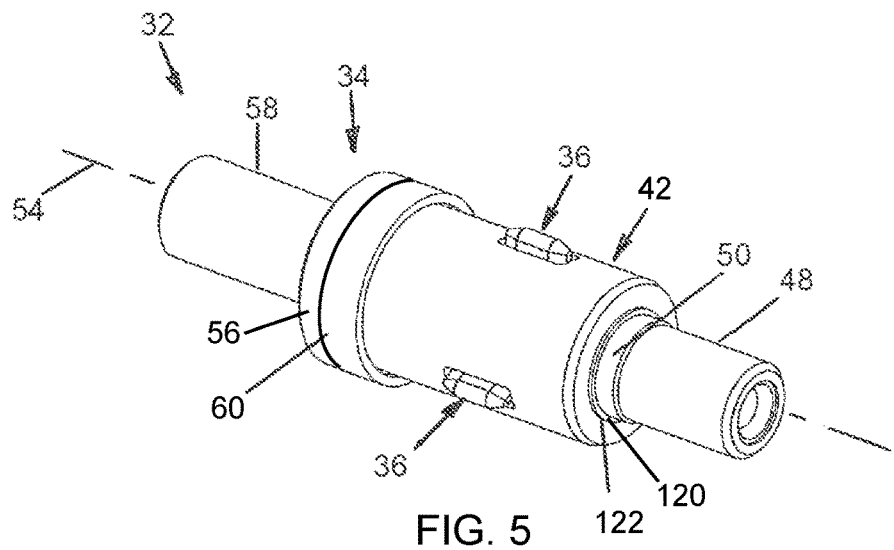
FIG. 5 is a perspective view of a hydraulically actuated workpiece holder for the pulley workpiece of FIG. 1.
Figure 6:
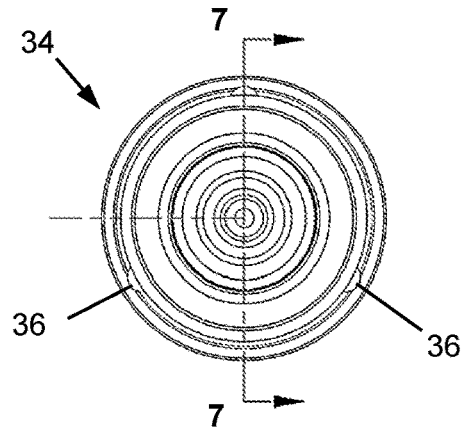
FIG. 6 is an end view of the workholder of FIG. 5.
Figure 7:
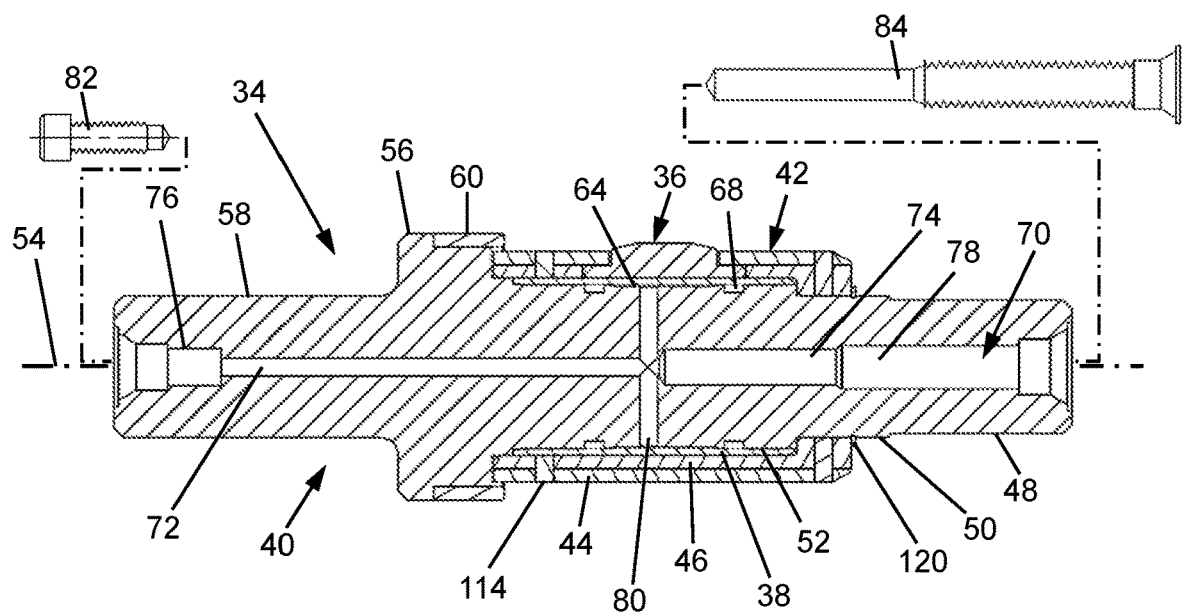
FIG. 7 is a full sectional view of the workholder of FIG. 5.

FIG. 5 illustrates a workpiece holder 32 in the form of an arbor 34 for holding a workpiece such as the pulley wheel 20. As shown in FIGS. 6 & 7, for engaging and holding the workpiece pulley, the arbor 34 may have at least two and desirably at least three equally circumferentially spaced apart locators 36 generally radially movable into engagement with the workpiece roller grooves by an expandable sleeve 38 carried by a body 40 and expandable by a pressurized hydraulic fluid such as a hydraulic oil or grease. The locators 36 may be retained on the body by a collar 42 received over the sleeve. The collar may have an outer sleeve 44 received over an inner sleeve 46.

The body 40 may have a series of cylindrical surfaces 48, 50, 52 with a common axis 54 and each having a diameter smaller than the diameter of the bore 24 of the workpiece, a shoulder 56 and a desirably cylindrical shank 58 for holding the arbor 34 and/or securing it in a chuck of a machine tool. The shank may be used to support the arbor such as when it may be used for carrying a workpiece for measurement or gauging purposes. To limit axial movement of the arbor into the bore 24 of the pulley workpiece and thus provide a desired axial position of the locators 36 in the bore, a stop ring 60 may be received and fixed such as by a press fit on the shoulder for engagement with an end face 62 of the hub of the workpiece.

In general, fluid pressure may be applied in any suitable manner to the interior of at least a portion of the sleeve 38 to expand the sleeve and move the locators 36 generally radially outward into engagement with a workpiece received on the arbor. The body may contain a fluid pressure system which may include an annular fluid chamber 64 which may be provided by an annular recess in the body underlying and opening onto an interior portion of the sleeve 38 with axially spaced apart seals such as O-rings received in circumferentially continuous grooves 68 in the body 40 providing seals between the body and the sleeve 38. The body may contain an axially extending through passage 70 defined by a series of interconnected bores 72 & 74 and counterbores 76 & 78 and communicating with the fluid chamber 64 through a transverse bore 80 through the body. A fluid such as hydraulic oil or grease in the passage 70, transfer bore 80, and fluid chamber 64 may be pressurized by threaded screws 82 and 84 received in complimentary threaded counterbores 76 and 78 of the passage. The screws may be advanced into the counterbores to pressurize the fluid to expand the sleeve 38 and move the locators 36 generally radially outward relative to the body 40 and retracted in the counterbore to decrease the fluid pressure and allow the locators to move generally radially inward such as to the position shown in FIG. 7. Alternatively, pressurized fluid may be provided to the fluid chamber by an external pressurized fluid supply system (not shown) which may include a pressurized fluid supply conduit such as a hose in communication with the fluid chamber through the passage which may be closed downstream of the transverse bore or may be a blind passage communicating with the transverse bore and opening through the shank end of the body. A suitable fluid pressure system is disclosed in U.S. Pat. No. 7,967,300 the disclosure of which is incorporated herein by reference.

The body 40 may be made of tool steel such as SAE 4140, SAE 6150 or SAE 8620 steel. The sleeve may be made of SAE 4140 or SAE 6150 steel and if greater expansion is desired, it may be made of a Nitinol material such as Nitinol 558 which will allow significantly greater expansion of the sleeve without any permanent deformation than if the same size sleeve were made of a steel such as SAE 6150 or SAE 4140. In some applications, the sleeve 38 may be made of a plastic material such as an acetal like Delrin™ or a polyamide such as nylon.

As shown in FIGS. 8-10, each locator 36 may have a base 90 and a protuberance or prominence 92 which in assembly extends generally radially outwardly of the base and through and outwardly of the retainer collar 42. The base may have a generally rectangular perimeter 94, an arcuate inner surface 96 which may have a radius substantially equal to the radius of the outer surface of the expandable sleeve 38, and an arcuate outer surface 98 with a radius substantially equal to the radius of the inner cylindrical surface 100 (FIG. 13) of the outer sleeve 44 of the collar. Each prominence may be axially elongate and have an outer peripheral surface 102 with a generally semi-circular portion 104, which may have a radius $R_5$ somewhat less than the radius $R_6$ (FIG. 4) of the curved portion of the roller grooves 28 of the workpiece 20 to hold and engage the workpiece. Adjacent its axial ends, each prominence may have a somewhat tapered or radially inwardly inclined curved surface 106 or bull nose which may facilitate generally axial insertion of the locator 36 into a roller groove 28 of the workpiece, avoid any scuffing or marring of the workpiece roller grooves, and define the maximum axial extent of the protuberance which may engage a roller groove of the pulley workpiece 20.

As shown in FIG. 11, the collar 42 may have the outer sleeve 44 slideably received over the inner sleeve 46. As best shown in FIG. 12, the inner sleeve may have circumferentially spaced apart generally rectangular throughholes 110 or recesses each configured to receive the base 90 of one of the locators 36, and, as shown in FIG. 13, the outer sleeve 44 may have circumferentially spaced apart generally rectangular throughholes 112 or openings through which only the prominence 92 portion of a locator may extend. If it is desired to permit each locator to float or move slightly axially or circumferentially or both relative to the arbor body 40 and the expandable collar 42, the perimeter of the respective holes 110 & 112 may be somewhat axially, circumferentially, or both larger than the corresponding locator base and prominence, respectively, to provide clearance between them when the locator is received in assembly in the collar 42. This floating locator arrangement may ensure each locator 36 will properly seat in an associated roller groove 28 of the pulley workpiece when held by the arbor 34. To retain the collar sleeves 44 & 46 in a properly aligned relationship of their holes 110, 112 for receiving the locators 36, pins 114 may be press fit into circumferentially spaced apart holes 116 through both sleeves and, desirably, adjacent their ends. The inner sleeve 46 may also have an inner shoulder 118 which in assembly on the arbor encircles the cylindrical surface 50 of the body 40. In assembly, the collar 42 may be retained on the arbor body by a snap ring 120 or the like received in a groove 122 in the body and bearing on an end face of at least the shoulder 118 of the inner sleeve. In assembly, the other end of the collar may bear on the shoulder 56 of the arbor body. The collar sleeves 44 & 46 may be made of a pliable or flexible polymeric material. Suitable polymeric materials may include nylon, Teflon, or other relatively high-density pliable polymeric materials.

To use the arbor 34 to support a workpiece such as the pulley wheel 20, the hydraulic pressure of fluid in the chamber 64 is relieved so that the metal sleeve is in a substantially unstressed or unexpanded state, then the arbor may be generally axially inserted into or disposed in the bore 24 of the workpiece with an end 62 of its hub 22 bearing on the arbor stop ring 60 and with the locators 36 generally aligned with and received in the roller grooves 28. The fluid pressure acting on the metal sleeve may then be increased such as by threading one or both screws into the passage 70 in the body 40 to pressurize a fluid such as hydraulic oil or grease in the passage and the chamber 64 to generally radially expand at least the portion of the sleeve 38 underlying the locators 36 and thereby move the locators generally radially outward into firm engagement with the portion of the roller grooves 28 on which their arcuate outer surfaces 104 bear to thereby firmly hold the pulley wheel 20 workpiece on the arbor. Desirably the arbor 34 holds the pulley workpiece without the retainer collar 42 bearing on the workpiece. While the pulley workpiece is held by only the locators bearing on the roller grooves of the hub of the pulley, it is believed this establishes a theoretical axis of the workpiece as if the pulley were actually received on and attached to a shaft by roller keys received in the roller grooves and complimentary grooves in the shaft. In any event, when the pulley workpiece is firmly held by the arbor, it will permit various measurements of the pulley wheel relative to this theoretical axis and of any runout of the peripheral surface 26 of the pulley wheel relative to this theoretical axis. To disengage and remove the arbor from the workpiece, or vice versa, the fluid pressure in the passage 70 and chamber 64 may be decreased or relieved by rotating one or both of the threaded screws in the counterbores 76 & 78 to retract them. Reducing or relieving fluid pressure in the chamber will permit the sleeve 38 to contract and the locators 36 to move radially inward so that the arbor and the pulley wheel may be relatively moved to withdraw the arbor from the wheel.

While the forms of the invention herein disclosed constitute presently preferred embodiments, many others are possible. For example, those of ordinary skill in the art will recognize that the present teachings readily may be adapted for use with a hydrostatic chuck (not shown) that is basically a female version of the disclosed workpiece arbor in which a sleeve is contracted by hydraulic fluid pressure to move locators radially inward into firm engagement with circumferentially spaced apart outwardly opening grooves in an exterior surface of a workpiece. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A workholder apparatus comprising:
a body;
a circumferentially continuous sleeve carried by the body and at least in part defining a circumferentially continuous fluid chamber between the sleeve and the body;
at least two circumferentially spaced apart locators carried by the body, disposed over the sleeve, and projecting radially of the sleeve; and
a collar at least partly overlying the sleeve,
wherein a pressurized fluid in the chamber can change the diameter of the sleeve to move the locators radially relative to the body into engagement with a workpiece so that the workpiece is carried by the workholder apparatus,
wherein the locators are received in part in the collar and a part of each locator extends radially outwardly of the collar for engagement with the workpiece when the locators are moved radially outward by expansion of the sleeve, and
wherein the collar comprises a recess, in which a base of an associated locator is received, and a hole, through which a prominence of the associated locator extends, the collar further comprising an outer sleeve disposed at least in part over an inner sleeve, wherein the inner sleeve at least partly defines the recess and the outer sleeve includes the hole.

2. The apparatus of claim 1 which has at least three circumferentially spaced apart locators each having a base portion overlying a portion of the sleeve and a prominence projecting radially outward of the base.

3. The apparatus of claim 2 wherein the sleeve is of a Nitinol material.

4. The apparatus of claim 1 which also comprises a stop carried by the body and configured to bear on the workpiece to limit the axial extent to which the workpiece may be received on the body to locate the workpiece axially relative to the locators.

5. The apparatus of claim 1 wherein the prominence of each locator has an axially extending outer surface configured for complimentary engagement with an adjacent portion of the workpiece received over the locators.

6. The apparatus of claim 1 which also comprises a stop carried by the body and engageable with the workpiece received over the locators to axially position the workpiece with respect to the locators.

7. The apparatus of claim 1 wherein the prominence of each locator is axially elongate and has an arcuate outer peripheral surface with a radius complimentary to the portion of the workpiece engaged by the prominence when moved outward into engagement with the workpiece.

8. The apparatus of claim 1 wherein the collar is axially retained on the body between a shoulder adjacent one end of the collar and, adjacent the other end of the collar, a ring received in a groove in the body and radially overlapping at least a portion of such other end of the collar.

9. The apparatus of claim 1 wherein the inner and outer sleeves of the collar are retained in axial and circumferential alignment with each other by at least one pin extending at least part way through both the inner and outer sleeves of the collar.

10. The apparatus of claim 1 which also comprises at least one passage in the body communicating with the fluid chamber, the passage opening through at least one end of the body and receiving a threaded screw configured to pressurize the fluid in the passage and the chamber by threading the screw into the passage in contact with the fluid in the passage.

11. The apparatus of claim 1 wherein the sleeve is of a Nitinol material.

12. A workholder apparatus comprising:
a body;
a circumferentially continuous sleeve carried by the body and at least in part defining a circumferentially continuous fluid chamber between the sleeve and the body;
at least two circumferentially spaced apart locators carried by the body, disposed over the sleeve, and projecting radially of the sleeve,
wherein each locator has a base overlying a portion of the sleeve and a prominence projecting radially outward of the base with at least a portion of the base extending axially, circumferentially, or both axially and circumferentially outwardly of the prominence; and
a collar having, for each locator, a recess in which the base of an associated locator is received and an opening overlying the recess through which the prominence of the received locator extends, the opening being smaller than the recess in which the base of the associated locator is receive,
wherein a pressurized fluid in the chamber can change the diameter of the sleeve to move the locators radially relative to the body into engagement with a workpiece so that the workpiece is carried by the workholder apparatus,
wherein the collar comprises an outer sleeve disposed at least in part over a separate inner sleeve, the recesses are circumferentially spaced apart along the inner sleeve, and the openings are circumferentially spaced apart in the outer sleeve.

13. The apparatus of claim 12 wherein the inner sleeve has circumferentially continuous portions axially outward of the recesses, and the outer sleeve has circumferentially continuous portions which at least in part overlie the circumferentially continuous portions of the inner sleeve.

14. The apparatus of claim 12 wherein at least one of the sleeves of the collar has axially opposed ends and the body has a shoulder at least in part overlapping one of the opposed ends and a groove adjacent the other opposed end with a ring received in the groove and overlapping at least in part the other opposed end to axially retain the collar and the locators in a position overlying an expandable portion of the sleeve.

15. The apparatus of claim 12 wherein the perimeter of the base of each locator is larger than the perimeter of the prominence of such locator.

16. The apparatus of claim 12 which also comprises, for each locator, axial clearance, circumferential clearance, or both axial and circumferential clearance between the base of the locator and the associated recess and between the prominence of the locator and the associated opening to permit movement of such locator relative to the collar respectively axially, circumferentially, or both axially and circumferentially.

17. The apparatus of claim 12 wherein the sleeve is of a Nitinol material and the body and locators are of steel.

18. A workholder apparatus comprising:
a body;
a circumferentially continuous metal sleeve carried by the body and at least partly defining a circumferentially continuous fluid chamber between the sleeve and the body;

at least two circumferentially spaced apart locators carried by the body, disposed over the sleeve, and projecting radially of the sleeve; and a collar at least partly overlying the sleeve, wherein a pressurized fluid in the chamber can change the diameter of the sleeve to move the locators radially relative to the body into engagement with a workpiece so that the workpiece is carried by the workholder apparatus, wherein the locators are retained on the body by the collar and a part of each locator extends radially outwardly of the collar for engagement with the workpiece when the locators are moved radially outward by expansion of the sleeve, and wherein the part of each locator that extends out of the collar is configured to be received by axially extending grooves of the workpiece such that the locators and the grooves are in angular registration with each other when the workpiece is carried by the workholder apparatus.

19. The apparatus of claim 18, wherein each locator includes an arcuate outer surface that engages with each respective groove of the workpiece during engagement of the locators with the workpiece, each arcuate outer surface having a radius less than a radius of a curved portion of the respective groove of the workpiece.

20. The apparatus of claim 18, further configured to hold the workpiece only by the locators bearing on the grooves of the workpiece such that the workholder apparatus does not engage an inner bore of the workpiece when the workpiece is carried by the workholder apparatus.

* * * * *